United States Patent [19]

Kunugi et al.

[11] Patent Number: 5,192,636
[45] Date of Patent: Mar. 9, 1993

[54] TONER AND A PROCESS FOR PREPARING THEREOF

[75] Inventors: Masanao Kunugi; Hidenori Kin; Tsuneo Handa, all of Suwa, Japan

[73] Assignee: Seiko Epson Corporation, Tokyo, Japan

[21] Appl. No.: 568,465

[22] Filed: Aug. 16, 1990

[30] Foreign Application Priority Data

| Aug. 18, 1989 | [JP] | Japan | 1-212605 |
| May 17, 1990 | [JP] | Japan | 2-127408 |
| May 17, 1990 | [JP] | Japan | 2-127409 |

[51] Int. Cl.$^5$ .................................... G03G 9/087
[52] U.S. Cl. .................................... 430/109; 430/120; 430/903

[58] Field of Search ............... 430/137, 138, 114, 111, 430/109, 120, 903

[56] References Cited

U.S. PATENT DOCUMENTS 4,873,166 10/1989 Senga et al. .................. 430/114
4,894,310  1/1990 Sakai ........................... 430/138

Primary Examiner—John Goodrow
Attorney, Agent, or Firm—Ladas & Parry

[57] ABSTRACT

A toner material comprises toner particles containing at least a coloring matter and a binder, said toner particle having electrically insulating properties and comprising an inside portion having a relatively high relative permittivity and a surface portion having a relatively low relative permittivity.

10 Claims, 1 Drawing Sheet

TONER AND A PROCESS FOR PREPARING THEREOF

BACKGROUND OF THE INVENTION

1. Field of the Invention

The present invention relates to toner materials for imaging by the electrophotographic technique used for printers, copying machines, facsimiles and the like and a process for preparing it. Particularly, the present invention relates to a toner having a multi-layer structure and a process for preparing it.

2. Description of Related Art

In the developing device of an imaging apparatus in an electrophotographic mode using a conventional toner, so-called two-component development has been employed. This is a method for developing an image on an electrostatic image carrier by using a magnetic powder such as iron powder as a carrier, attaching a toner to the surface of the carrier by electrostatic force and transferring the toner on a transporting means in taking advantage of the movement of the carrier by magnetic force (see, for example, C. H. Young & H. G. Greig: R.C.A., 15 (4), 471, 1950). Two-component development has successfully realized a uniform and high density development over the entire range of an image portion, since the carrier acts as an electrode in the neighborhood of the electrostatic image carrier, so that it can correct the shape of the electric lines of force generating from the external surface of the electrostatic image carrier and emphasize a development electric field. The two-component development, however, has disadvantages in that the development apparatus has a short lifetime because of the carrier being susceptible to decomposition and that the development apparatus has a complicated structure for maintaining a constant mixing ratio of the carrier and the toner, and the toner within the development apparatus can be controlled only by complicated sequences. Therefore, the two-component development mode has hitherto been used only for high-speed imaging apparatuses of comparatively high grade.

In order to solve these problems, a small size low-speed imaging apparatus employing mono-component development in which a toner having afforded thereto magnetic properties is used in the absence of a carrier for the development of an image on the electrostatic image carrier (see, for example, U.S. Pat. No. 4,121,931). The toners used in such development include conductive and insulating ones, among which the latter ones are used more popularly in view of the transfer coefficiency of the toner onto recording paper.

Conventional insulating toners used for these development methods are particles comprising a simple substance or blend of a thermoplastic resin such as a styrene-acrylate copolymer or a polyester or a wax in which a color pigment such as carbon black has been dispersed. The particle has a charge control agent or a fluidization improving agent attached to its surface, if necessary, and further has ferromagnetic fine particles such as iron oxide uniformly dispersed into it.

The aggregate of the particles has an insulating property and a specific electric resistance in the range of $10^{13}$–$10^{15}$ $\Omega.cm$. It ordinarily has a dielectric constant of about 3.

As an example taking much account of the dielectric constant in the conventional toners, Japanese Patent Publication No. 6457/89 discloses a toner of which the external surface has been incorporated with at most 5% by weight of fine particles having a high relative permittivity.

On the other hand, in mono-component development, the vicinal electrode effect owing to any carrier cannot be expected so that the electric lines of force generating from the external surface of the electrostatic image carrier cannot be corrected. Thus, the mono-component development has a problem in that only image of a low quality can be obtained when compared with the two-component development because of the so-called edge effect in which the toner at the edge portion of an image is preferentially developed, while the toner at the central portion of the image is developed poorly. In order to obtain a satisfactory development density, it is required that the distance between the electrostatic image carrier and the transporting means, i.e. a development gap, be set up at a very small value and that the value set up be strictly controlled. Parts constituting the developing device must have a high precision in order to satisfy the aforementioned requirement, so that it leads to an extensive increase in cost and thus a stable process cannot be maintained under these circumstances.

The toner disclosed in Japanese Patent Publication No. 6457/89 is effective for preventing the development of a polarizing toner at an image edge portion, while it appears of substantially no effect on the aforementioned problem.

Furthermore, toners having a variety of structures and processes for preparing the toners have been proposed for eliminating the aforementioned problems and improving the functions of toners. For example, there are proposed a toner in which conductive particles are fixed on the surface of a toner in a hot air stream and insulating particles are further fixed thereon in a hot air stream to form a structure having both a conductive layer and an insulating layer on the surface of the toner particles (Japanese Patent Laid-Open Publication No. 257763/88), toners having a multi-layer structure such as microcapsule toners prepared by the polymerization method and used for low-energy fixing (U.S. Pat. 3,080,250, Japanese Patent Publication Nos. 31066/84 and 36934/89), toners of which an external surface is coated with a charge control resin film layer for controlling charge with the use of the high speed impact method in the dry process (Japanese Patent Laid-Open Publication No. 62666/88) or a toner of which the surface has been treated with a resinous finely divided powder in order to obtain anti-blocking properties (Japanese Patent Laid-Open Publication No. 105261/89).

These conventional toners, however, still have some points which needs to be improved.

SUMMARY OF THE INVENTION

The object of the present invention is to solve these problems and to provide a toner with which the electric lines of force generating from an electrostatic image carrier can be corrected so that the developing electric field is emphasized and an image having a high quality is realized without severely decreasing or exactly controlling the development gap, and a process for preparing it.

The present invention provides a toner material comprising toner particles containing at least coloring matter and a binder, the toner particle having an electrical insulation property and comprising an inside portion having a relatively high permittivity and a surface portion having a relatively low permittivity.

According to the preferred embodiment of the above-described particle wherein the inside portion comprises a core material containing at least the coloring matter and the binder, the core material having a permittivity which is higher than that of the surface portion, and the surface portion comprises an insulating layer surrounding the core material.

Furthermore, the present invention provides a process for preparing the above-described toner particle comprising forming the insulating resin layer on the surface of the core material by a mechanochemical reaction.

In the toner according to the present invention, the highly dielectric material is surrounded within the toner particle, so that the dielectric constant of the toner increases and the relative permittivity of the space within the development gap increases. The gap calculated in terms of the vacuum is represented by the following equation:

$$\frac{t}{\epsilon t} + \frac{s}{\epsilon s}$$

wherein εt represents the mean relative permittivity of the toner layer on the transporting means, t represents the thickness of the layer, es represents the relative permittivity of the electrostatic image carrier and s represents the thickness of the carrier. The gap calculated in terms of the vacuum is in inverse proportion to the relative permittivities, so that the gap calculated in terms of vacuum decreases to exhibit the same effect as the virtual decrease in the development gap and thus the edge effect decreases when the toner according to the present invention is used. When εt is increased, the variation of the gap calculated in terms of vacuum is decreased to the variation of the development gap and the developing electric field scarcely varies even if the development gap varies. That is, the margin for the development gap is extended.

On the other hand, if the permittivity of the toner layer is increased excessively, the electrostatic capacity of the toner layer increases and the voltage applied to the toner is lowered, so that the toner shows a more distinguished polarization effect and the developing electric field is decreased conversely. As a result, the development density is decreased. That is, the electric field Ed is represented by the following equation:

$$Ed \propto \frac{1}{\epsilon t \cdot \{(s/\epsilon s) + (t/\epsilon t)\}}$$

and is decreased along with the increase of εt.

The toner according to the present invention has a structure that the highly dielectric portion is omnipresent only inside of the toner, so that the increase of the relative permittivity of the toner layer can be minimized and the stream of the electric lines of force within the toner layer can be disproportionated to decrease the polarization effect of the toner. Thus, the decrease of the developing electric field can be minimized and the lowering of the development density can be prevented.

When the toner according to the present invention is used, the electric lines of force generating from the latent image support are focussed on the high dielectric portions of the vicinal toner particles to correct the electric lines of force. That is, it becomes possible to make toner particles in the vicinity of toner particles to be developed, play a role of a carrier in the two-component development process. Thus, the stabilization of the developing electric field and the lowering of the edge effect can be further prompted. Therefore, an image having a stable density and a high quality is obtained according to the toner of the present invention.

The charge control of the toner according to the present invention can be stabilized by maintaining the electric insulating properties between toners. Furthermore, the electric insulating properties prevent the toner from insufficient transfer which is caused by pouring the charge having an opposite polarity to the polarity of a charged toner on the electrostatic transfer of the toner on the electrostatic image carrier onto a recording paper. Thus, an image having an excellent quality can be formed on plain paper.

BRIEF DESCRIPTION OF THE DRAWINGS

FIGS. 1 (a)-(d) illustrate the sectional structures of the toner particles according to the present invention in Examples.

DETAILED DESCRIPTION OF THE INVENTION

Toner Particles

The toner material according to the present invention comprises toner particles containing at least coloring matter and a binder, the toner particle having electrically insulating property and comprising an inside portion having a relatively high permittivity and a surface portion having a relatively low permittivity.

The term "an inside portion having a relatively high permittivity and a surface portion having a relatively low permittivity" means that the permittivity of an inside portion of the particle having a certain thickness is higher when compared with that of a surface portion of the particle having a certain thickness. Preferred results are given if the permittivity of the inside portion is at any rate higher than that on the surface portion. The relative permittivity of the inside portion is preferably 6 or more, more preferably 10 or more, and the relative permittivity of the surface portion is less than 6, more preferably 3 or less. As an example, preferred results are given, for when the dielectric constant on the surface of the toner is 3 (at the applied frequency of 1 kHz) which is a typical value of a conventional toner particle and the dielectric constant inside the particle is higher than 3, preferably 6 or more, and more preferably 10 or more.

The term "electric insulating property" means that each particle has an electric resistance required for stable charging on the toner particle and for maintaining good transfer efficiency of the toner to a recording paper. According to the experiments of the present inventors, good results were obtain, if the gap between two parallel plate electrodes was tightly filled with toner particles and an electric field of 2 KV/cm was applied to the toner to give a specific resistance of 1 $\times 10^{13}$ Ω.cm, preferably 1 $\times 10^{14}$ Ω.cm.

If the toner particles according to the present invention have the aforementioned characteristics, the binder containing the coloring matter may be placed either at the interior portion or on the surface of the particle. It is also possible to use conventional coloring matters and binders directly as the toner materials according to the present invention.

According to the preferred embodiment of the above-described particle wherein the inside portion comprises a core material containing at least a coloring matter and a binder, the core material having the permittivity which is higher than that of the surface portion, and the surface portion comprises an insulating layer surrounding the core material. The term "surrounding the core material" means the state where the core is covered with a substance which is electrically insulating and has a lower relative permittivity than the core, so that the above-mentioned electric insulating property is maintained.

The core material for the toner particle in the preferred embodiment according to the present invention is preferably highly dielectric and at the same time has electric conductive properties, which are preferably in the range of $10^2$–$10^4$ $\Omega$.cm in time of specific resistance.

The core material in this embodiment comprises at least a coloring matter and a binder.

In this embodiment, the inside portion of the highly dielectric particle comprises mainly a coloring matter and/or a binder. Therefore, the coloring matter and/or the binder should be selected from those which enables the permittivity at the inside portion of the particle to reach the required value.

The coloring matter specifically includes pigment particles such as carbon black, spirit black or black titanium oxide or dyes such as nigrosine or the like.

As the specific examples of binders, there are mentioned the following waxes, thermoplastic resins, thermosetting resins, water-soluble resins or the like. The waxes include one or a blend of the two or more of those selected from natural plant waxes such as candelilla wax, carnauba wax or rice wax; animal waxes such as beeswax or lanolin; natural petroleum type waxes such as montane wax, paraffin wax, microcrystalline wax or petrolatum; synthetic hydrocarbon waxes such as polyethylene wax or Fisher-Tropsch wax; denaturated waxes such as montun wax or paraffin wax derivatives; hydrogenated waxes such as hardened caster oil derivatives; waxes such as synthetic waxes or the like; higher fatty acids such as stearic acid, palmitic acid or the like; polyolefins such as low molecular weight polyethylene, polyethylene oxide, polyprolylene or the like; or olefin copolymers such as an ethylene-acrylic acid copolymer, and ethylene-acrylate ester copolymer or an ethylene-vinyl acetate copolymer.

The specific examples of the thermoplastic resins include one or a blend of the two or more of those selected from a polystyrene resin and its copolymer, a hydrogenated styrene resin, a styrene-isobutylene copolymer, an ABS resin, an ASA resin, an AS resin, an AAS resin, an ACS resin, an AES resin, styrene-P-chlorostyrene copolymer, a styrene-propylene copolymer, a styrene-butadiene crosslinked polymer, a styrenebutadiene-chlorinated paraffin copolymer, a styrenebutadiene rubber emulsion, a styrene-maleate ester copolymer, a styrene-isobutyrene copolymer, a styrenemaleic anhydride copolymer, an acrylate or methacrylate type resin and its copolymer, a styrene-acrylic resin and its copolymer such as a styrene-acrylic copolymer, a styrene-diethylamino-ethyl methacrylate copolymer, a styrene-butadiene-acrylate ester copolymer, a styrene-n-butyl methacrylate copolymer, a styrene-diethylaminoethyl methacrylate copolymer, an epoxy resin, a silicone resin, a polypropylene and its copolymer, a fluorine resin, a polyamide resin, a polyvinyl alcohol resin, a polyurethane resin, a polyvinyl butryal resin and the like.

The specific example of the thermosetting resins include an epoxy resin, an urethane resin, a silicone resin, a melamine resin, a phenol resin, a urea resin, an alkyd resin and the like. Furthermore, the water-soluble resins include polyvinyl alcohol, polyacrylic alcohol, polybenzyl alcohol, poly-2-hydroxyethyl methacrylate, polyvinyl pyrrolidone, polyvinyl pyridine, polyvinylamine, polyallylamine, polyacryl amide, poly acrylic acid, polyvinyl methacrylic acid and the like.

The core material can be further incorporated with a dispersing agent such as a metal soap or the like, a fluidity improving agent such as silicon dioxide particles, fluorine type resin particles or the like.

Further examples of the dispersing agent include an electron acceptable organic complex, a chlorinated polyester, a nitro humic acid, a quaternary ammonium salt, a pyridinyl salt and the like.

In order to afford the particle ferromagnetic properties, if necessary, it is possible to add a ferromagnetic powder such as iron oxide, ferrite, iron, cobalt, nickel or the like.

As a substance for forming an electrically insulating layer surrounding the core material, there can be used the aforementioned thermoplastic resins for the core material, particularly a polymethyl methacrylate, a polyethyl methacrylate, a poly-n-butyl methacrylate, a polyester, a styrene-butadiene copolymer, a PVC, PVA or PVAC copolymer, a poly-$\gamma$-methyl-L-glutamate or the like.

In the toner particle according to the present invention, the core material size can be determined within the range in which the effect of the present invention will not be impaired. The particle preferably has a mean particle size of 3–50 $\mu$m, more preferably 5–30 $\mu$m, further more preferably 8–20 $\mu$m.

The thickness of the insulating layer surrounding the core material can be also determined appropriately depending on its application conditions. When the core material is in the range described above the insulating layer has preferably a thickness of 0.3–2.5 $\mu$m, more preferably 0.5–1.7 $\mu$m. If the layer is excessively thin, it has an insufficient electric insulating properties and unstable charging, and the volume occupied by the highly dielectric material in the development gaps increases excessively to cause unstable development. On the other hand, if the layer has an excessively large thickness, electric insulating property can be secured, while the content of the color pigment decreases based on the whole toner and thus the maximal image density decreases. Furthermore, the area occupied by the highly dielectric material in the development gaps decreases excessively, so that the shape of the electric lines of force relating to the development cannot be corrected sufficiently and does not exhibit a satisfactory effect for image formation. Accordingly, the insulating layer preferably has an optimal volume in a proportion of about 30–100 to 100 of the volume of the highly dielectric material in the toner.

The toner particle according to the present invention is further explained below with reference to the drawings.

FIGS. 1(a)–(d) illustrate the sectional structures of the toner particles according to the present invention in Examples.

In the toner particle illustrated in FIG. 1 (a), a core 1 comprises a highly dielectric material at a high concentration, and an electric insulating material having a low relative permittivity as a layer 2 surrounds the core 1. If the coloring matter is contained in the core 1, an image density sufficient to imaging is obtained.

The toner particle illustrated in FIG. 1 (b) has the structure which comprises a core material 4, a layer 5 comprising an electric insulating material and a layer 3 which comprises a highly electroconductive material provided between the core 4 and the layer 5. In this particle, the whole of the core 4 and the layer 3 can be regarded substantially as a highly dielectric portion. Such an electroconductive layer includes a core material 4 having embedded into the external surface thereof a dielectric fine particle such as carbon black or ITO (Indiam Tin Oxide) to provide electroconductivity. The electronconductive film forming method such as the vacuum deposition method, the vacuum sputtering method, the ion sputtering method, the wet plating method or the like. As the electroconductive film, there can be used not only an inorganic material but also an electroconductive film of an organic polymer. The toner having such a structure is excellent in that high permittivity can be obtained without incorporating a large amount of a material for obtaining high relative permittivity into the toner; which material affected the thermal behaviors (viscosity or fluidity upon its melting by heating) of the toner.

The toner particle illustrated in FIG. 1 (c) has a structure in which a fibrous material 6 having a high electroconductivity extends radially from the center of the particle through the electrically insulating resin 7 containing a coloring matter. The fibrous materials having electroconductivity are connected electrically to each other at the center of the particle. If these fibrous materials are extended oppositely from the center of the toner, the electric lines of force can be concentrated. In this particle, the center portion of the toner can be regarded as substantially a highly dielectric portion. As the electroconductive fiber, metal fibers such as copper, iron and the like and carbon fibers can be used.

The toner particle illustrated in FIG. 1 (d) has a structure that the fine particles 8 as the binder containing a coloring matter are concentrated into the center of the toner particle to form a core. If the solid component having a high dielectric constant is incorporated in an excessive amount into the other particle, only an insufficient viscosity is often obtained on the heat fusion of it on a recording paper. In the structures of this particle, satisfactory viscosity can be obtained and thus the toner can be fixed at a low temperature with a low viscosity material having a low fusing temperature.

Preparation of Toner Particles

The toner particles according to the present invention can be prepared by an appropriate preparation method which can realize the structure of the toner. Suitable preparations are illustrated below.

The toner particle comprising the core material and the insulating layer consisting of an electrically insulating material surrounding the core material is preferably prepared first by providing the core, and making the insulating layer of an insulating resin on a surface of the core by means of a mechanochemical reaction.

The core material having a preferred particle size described above, for example a mean particle diameter of about 10 $\mu$m is prepared from raw materials such as the coloring matter, the binder and appropriate additives by the conventional method for forming toner particles, that is the milling method, the spray drying method, the polymerization method or the like.

The surface of the core material thus obtained is next coated with an electrically insulating resin by the mechanochemical reaction. The term "coated by the mechanochemical reaction" means that a resin layer is formed on the surface of the particle by the use of thermal energy and mechanical energy at the same time. In other words, application of external mechanical energy (such as compression, hearing, friction or the like) to the resin generates thermal energy. The surface portion of the resin reaches instantly and partly an extremely high energy level. The resin layer is formed on the surface of the core taking advantage of the facts that physical change tends to occur and reaction tends to occur at atomic level in such activated states.

It is preferably that the core materials and fine resin particles having a particle diameter smaller than the core material are blended with each other and then subjected to the mechanochemical reaction. The fine resin particles homogeneously adhere to the surface of the core material by electrostatic force, chemical adsorptively and physical adsorptively. The fine resin particles thus adhered are then spread to form a film by thermal energy generated by friction or the like, mechanical compressive force or shearing force. The particles adhere considerably firmly by the single treatment, and thus multiple treatment is not required.

The mechanochemical reaction is preferably carried out at a treatment temperature X (°C.) in the range from T $-10$ to T (T$-10°$ C.$\leq$X$\leq$T), wherein T is a glass transition temperature (°C.) of the insulating resin used for the insulating layer. When the treatment is carried out at a temperature exceeding the glass transition temperature, the insulating resins agglomerate with each other and thus sometimes fail in the formation of the insulating layer. When the treatment is carried out at a temperature of more than 10° C. lower than the glass transition temperature, a sufficient amount of heat for the change of the insulating resin is not applied to it.

From another viewpoint, it is preferably to use the insulating resin of which viscosity $\eta_g$ is lower than or equal to the viscosity $\eta_b$ of the present particle at a temperature of causing the mechanochemical reaction, since it is easily formed into a film by mechanical energy after the coating resin adheres to the core material, so that the entire surface of the parent particle can be homogeneously coated with the film.

As the method for conducting the mechanochemical reaction, there are mentioned, for example the method using high speed fluid agitators such as MECHANOFUSION SYSTEM (available from HOSOKAWA MICRON Corp.), NARA HYDRIDIZATION (available from NARA KIKAI Corp.) or MECHANOMILL (available from OKADA SEIKO Corp.). The apparatuses for conducting the mechanochemical reaction is not limited to those described above and any other apparatuses which can apply mechanical and heat energies to the particle may be also used.

The toner particle according to the present invention is explained with reference to Examples without limitation thereto.

EXAMPLE A1

| (1) Preparation of core materials | |
|---|---|
| Polyethylene oxide wax | 5 parts by weight |
| Paraffin wax | 20 parts by weight |
| Polystyrene | 20 parts by weight |
| $Fe_3O_4$ | 75 parts by weight |
| Carbon black having an electroconductivity (KECHEN BLACK EC600JD; LION-ACQUZO Corp.) | 0.5–4 parts by weight |
| Black $TiO_2$ | 2.0 parts by weight |

The composition of the raw materials described above was blended sufficiently in a batch-wise screw kneader, ground in a jet airborne grinder and classified in an airborne classifying device to obtain core materials having an average particle diameter of 10 μm. The specific resistance and dielectric constant of the parent particle thus obtained were measured. The results are shown in Table 1.

TABLE 1

| Sample No. | Amount of carbon black (parts by weight) | Resistivity (Ω · cm) | Dielectric constant |
|---|---|---|---|
| 1 | 0.5 | $2 \times 10^{10}$ | 7 |
| 2 | 1.0 | $1 \times 10^{8}$ | 30 |
| 3 | 2.0 | $4 \times 10^{6}$ | 70 |
| 4 | 3.0 | $1 \times 10^{4}$ | 170 |

(2) Preparation of insulting layer

A styrene-acrylic resin layer having a thickness of about 1 μm was formed on the surface of the highly dielectric core material thus obtained by the mechanochemical reaction of styrene-acrylic fine particles (average particle diameter: 0.3 μm) with a MECHANOFUSION surface treatment apparatus (HOSOKAWA MICRON Corp.).

Next, the surface of the styrene-acrylic resin was coated with $SiO_2$ fined particles as a charge control agent with a Henschel mixture to give mono-component insulating magnetic toners having an average particle diameter of 12 μm.

The toners thus obtained showed satisfactory insulating properties such as the resistivity of $3 \times 10^{14}$ Ω.cm.

(3) Formation of images

Imaging tests were conducted with a toner prepared above in an image formation system provided with a conventional mono-component magnetic development device.

Figure 1A:
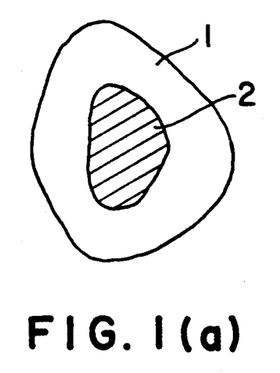
Figure 1B:
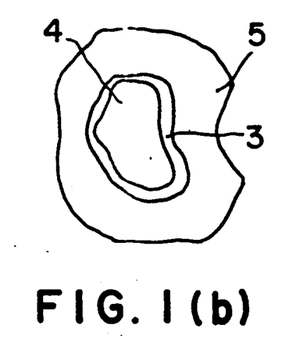
Figure 1C:
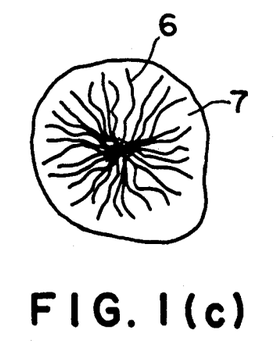
Figure 1D:
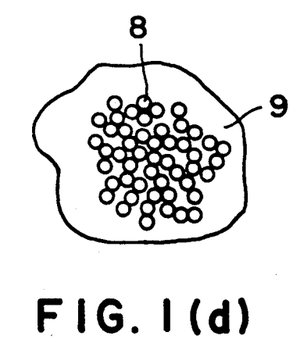
Figure 2:
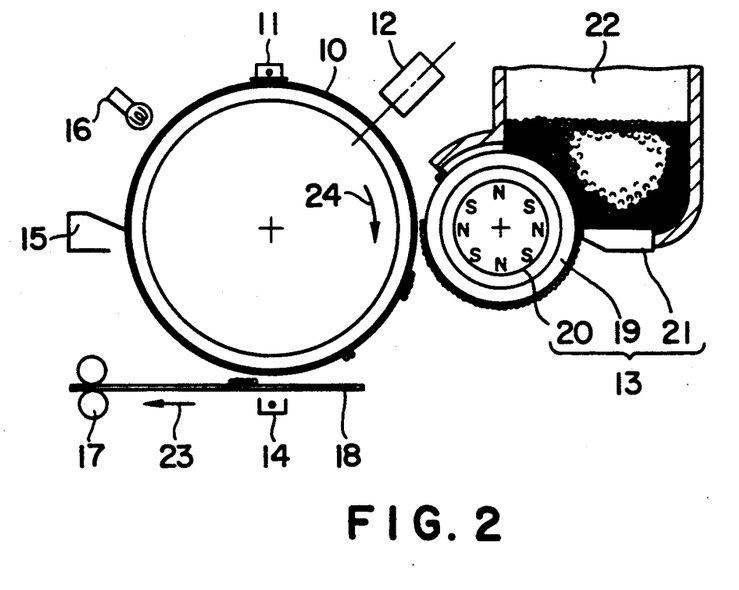
FIG. 2 illustrates the sectional view of a system in which an image is formed with use of the toner according to the present invention.

FIG. 2 illustrates the sectional view of the process of the conventional imaging system used. A photosensitizer, i.e. a electrostatic image carrier, is an OPC (Organic Photo Conductor), and the OPC 10 rotates to the direction of the arrow 24 to form an image. A scotron charger 11, a laser scanning image exposing unit 12, a magroller mono-component development device 13, an electrostatic transfer unit 14, a blade cleaning unit 15 and a decharging lamp 16. A recording paper 18 is conveyed to the direction of the arrow 23, and the toner transferred on the recording paper 18 is fused in a heat roller type heat fixing device and fixed on the recording paper. The developing device used in the present imaging system has a structure in which a sleeve 19 in the form of a electronconductive drum is used as a toner transporting means and a cylindrical magnet 20 which is multipolar magnetized in the sleeve is provided coaxially with the sleeve and rotates to an opposite direction to the rotating direction of the sleeve during development. The toner particle is conveyed to the development range by the magnetic force generated along with the rotations of the sleeve 19 and the magnet 20. The mount of the toner conveyed to the development range by the sleeve is determined by a doctor blade 21 which is fixed apart from the sleeve at the predetermined distance. The gap between the OPC drum and the sleeve of the development device can be structurally controlled. The following discussion was also realized completely even with the so-called one and half component magnetic brush type development device in the present system into which device a magnetic particle having substantially the same quality and particle diameter as a carrier has been incorporated in a small amount.

The tolerance of the development gap of the toner thus prepared was examined with the aforementioned imaging apparatus. The maximum development gap with a conventional toner was 30 μm. The minimum developing amount is determined by a permissible image density, and the evaluation was conducted with a standard image density of 1.4 and a minimum criterion of 1.2. The maximum criterion was determined in view of the provision that the poor fixation on a recording paper due to the excessive developing amount and the increase of the toner waster and thus the decrease of papers to be printed per unit amount of the toner occur only within the tolerance. As a result, the tolerance of the developing amount was set up within ±20% based on the standard amount. In comparison with the conventional example, when the case of using the toner according to the present invention was evaluated by the same criteria as described above, the tolerance of the variation in the development gap was extensively improved to the maximum of 400 μm.

The edge effect was evaluated by the organoleptic judgment of the quality of a print which was obtained by the square pattern having a length of 1 cm by a plurality of persons. The evaluation of the quality was carried out on a scale of 1 to 5 in which the grade 1 was the worst and the grade 5 was the best. The image obtained with a conventional toner by the mono-component development was graded 2 and the image obtained from the imaging device by the two-component development was graded 4 according to the scale.

The results of the evaluation of image qualities for the samples in this example are shown in Table 2.

TABLE 2

| Sample No. | Permissible development gap (μm) | Evaluation of image |
|---|---|---|
| 1 | 60 | 3 |
| 2 | 300 | 4 |
| 3 | 400 | 4 |
| 4 | 400 | 3 |

The image quality of the sample No. 4 evaluated as slightly low, since poor fixation occurred in this sample. This indicates that the image quality will cause problems if carbon block is incorporated in an excessive amount. In the case of this example, the content of the carbon for affording electroconductivity is preferably in the range of 1–3 parts by weight.

A further feature of the present invention consists in the substantially constant image density irrelative to the development voltages at any development gap within the tolerance defined in Table 2. Therefore, the toner

EXAMPLE A2

(1) Preparation of core material

| | |
|---|---|
| Polyethylene oxide wax | 5 parts by weight |
| Paraffin wax | 5 parts by weight |
| Polyester | 40 parts by weight |
| $Fe_3O_4$ | 80 parts by weight |
| Carbon black (PRINTEX 55; DEGUSSA Corp.) | 3 parts by weight |

The core material having an average particle diameter of 10 μm was obtained from the composition of the raw material described above in the same manner as Example A1.

the specific resistance and dielectric constant of the parent particle thus obtained were substantially the same s those of conventional toners. The specific resistance was $8 \times 10^{13}$ Ω.cm, and the dielectric constant was 3.

Carbon black (ACETYLENE BLACK; DENKIKAGAKU KOGYO Corp. was externally added and fixed to the surface of the particle thus obtained. The amount of the carbon black externally added and fixed was 1–3% by weight to the particle weight.

The specific resistance and dielectric constant of particles to which carbon black had been externally added were measured. As the results, the specific resistance was $7 \times 10^{2}$ Ω.cm and the dielectric constant was 230.

(2) Preparation of insulating layer

A styrene-acrylic resin coat layer having a thickness of about 1 μm was formed on the surface of the core materials in the same manner as Example A1. Then, the surface of the styrene-acrylic resin was coated with $SiO_2$ fine particles as a charge control agent with a Henschel mixture to give a mono-component insulating magnetic toner having an average particle diameter of 12 μm.

(3) Formation of images

The toner thus obtained was evaluated for imaging in the same manner as Example A1, and the effect was confirmed to be equal to that of Example.

One of the features of this example consists in that ordinary carbon black other than the electroconductive type can be used for the preparation of a highly dielectric particle and thus a low viscosity is realized on the fusion of the other. The toner can be fixed on a recording paper at a lower fixing temperature. The toner of this example decreased the fixing temperature more extensively of up to 20° C. when compared with the toner of Example A1 provided that the toners in these examples have the same compositions of the resin and wax.

EXAMPLE A3

Terephthalic acid, hexamethylene diol and glycerol as the binders, a coloring matter, magnetite as a magnetic material and fine particles of barium titanate as a highly dielectric material were blended and dispersed in a colloid mill, and the dispersion thus obtained was subjected to reduced pressure with heating to give a block of a crosslinked polyester resin. The block comprised 30 parts by weight of the polyester resin, 45 parts by weight of magnetite and 25 parts by weight of barium titanate and had a dielectric constant of 230. The resin block was then ground mechanically to give a ground product, which was then dispersed into an aqueous solution and further ground in a colloid mill. The aqueous solution was removed, and the residue was dried to give a highly dielectric fine particle having a maximum particle diameter of 1 μm and an average particle diameter of 0.3–0.5 μm.

A 100 parts by weight portion of the highly dielectric fine particle was dispersed into 15 parts by weight of the polyester resin in a batch-wise screw kneader. The polyester resin is a low-melting point material which has a glass transition temperature of 40° C. and can realize a low viscosity on fusion even if a large amounts of solids are incorporated, so that heat fixing can be easily conducted. The kneaded product thus obtained was ground under cooling in a jet airborne grinder, and the particle diameter distribution was controlled with an airborne classification device to give particles having an average particle diameter of 10 μm. The surface of the particle thus obtained was coated with styrene-acrylic resin fine particles (average particle diameter: 0.3 μm) by the mechanochemical reaction in a MECHANOFUSION surface treatment apparatus (HOSOKAWA MICRON Corp.) to form a styrene-acrylic resin coat layer having a thickness of about 1 μm.

Then, $SiO_2$ fine particles as a charge control agent were externally added to the surface of the styrene-acrylic resin with a Henschel mixer to give a mono-component insulating magnetic toner having an average particle diameter of 12 μm.

The toner thus obtained showed a satisfactory insulating property such a the resistivity of $7 \times 10^{14}$ Ω.cm.

The toner thus obtained was evaluated for its imaging in the same manner as Example A1, and the effect was confirmed to be equal to that in Example A1.

EXAMPLE A4

The highly dielectric fine particles having an average particle diameter of 0.3–0.5 μm which was prepared in Example A3 was dispersed into a mixture of a styrene monomer and an acrylic monomer to give a homogeneous dispersion. The dispersion was then suspension polymerized with the use of BPO as a polymerization initiator by the well-know method such as described in Japanese Patent Publication No. 10231/61 to give a styrene-acrylic particle having an average particle diameter of 10 μm into which the highly dielectric fine particles had been dispersed. The particle comprised 15 parts by weight of the styrene-acrylic resin and 85 pars by weight of the highly dielectric fine particle. The surface of the particle thus obtained was coated with styrene-acrylic resin fine particles (average particle diameter: 0.3 μm) by the mechanochemical reaction in a MECHANOFUSION surface treatment apparatus (HOSOKAWA MICRON Corp.) to form a styrene-acrylic resin coat layer having a thickness of about 1 μm. Then, $SiO_2$ fine particles as a charge control agent were externally added to the surface of the styrene-acrylic resin with a Henschel mixer to give a mono-component insulating magnetic toner having an average particle diameter of 12 μm.

The toner thus obtained showed satisfactory insulting properties such as resistivity of $5 \times 10^{14}$ Ω.cm.

The toner thus obtained was evaluated for its imaging in the same manner as Example A1, and the effect was confirmed to be equal to that in Example A1.

EXAMPLE A5

A toner having an average particle diameter of 12 μm was prepared with polyvinylidene fluoride fine particles as a highly dielectric material in the same manner as Example A3. The crosslinked polyester resin in this example had a composition which comprises 10 parts by weight of the polyester resin, 50 by weight of magnetite and 40 parts by weight of the polyvinylidene fluoride and a specific resistance of 7.

When the toner thus obtained was evaluated for its imaging in the same manner s Example A1, the image quality was obviously superior to the one obtained with a conventional mono-component toner. The permissible development gap was also larger than the one of the conventional toner thus confirming the same effect as Example A1.

Polyvinylidene fluoride is colorless, and thus the toner can be optionally colored readily. For example, a red or other colored magnetic powder in place of the black magnetic material such as magnetite is advantageous for the preparation of the colored toner which exhibits a color of the magnetic powder used.

EXAMPLE B1

| (1) Preparation of Core materials | |
|---|---|
| Styrene-acrylic copolymer | 53 parts by weight |
| Fe₃O₄ | 43 parts by weight |
| Carbon black | 4 parts by weight |

The composition of the raw materials described above was kneaded in a screw extruder, cooled and roughly ground. Then, it was ground with a jet grinder and classified to give core material having a particle diameter in the range of 5-20 μm (an average particle diameter: 10 μm).

(2) PREPARATION OF INSULATING LAYER

An insulating layer was formed with a blend of an acrylic fine particle has a particle diameter of 0.4 μm and a glass transition temperature of 80° C. The blend had the following composition on treatment:

| Core materials | 100 parts by weight |
|---|---|
| Acrylic fine particle | 12 parts by weight |
| SiO₂ | 8 parts by weight |

The viscosities of the core material and the acrylic fine particle was measured with a plate slip viscometer. The core material having a viscosity $\eta_g$ was $5.7 \times 10^5$ cP at 80° C., and the acrylic fine particles had a viscosity $\eta_b 3.0 \times 10^4$ cP at 80° C.

These raw materials were blended, and an insulating layer having integrated therein a resin was formed on the surface of the parent particle by the mechanochemical reaction in a MECHANOFUSION system (HOSOKAWA MICRON Corp.) to give a toner. The treatment was conducted at a temperature of 80° C., and then the toner was passed through sieves to conduct classification.

The toner thus obtained had a particle diameter of about 12 μm, and the insulating layer had a thickness of about 1 μm. The electric resistance was measured by the pressure cell method with a sample being placed between two electrodes and a pressure of 15 kg/cm² being applied to the sample.

The acrylic fine particle used in this example has a specific resistance of $10^{14}$ Ω.cm or more. As an index to the fluidity, the angle of repose was also measured with an electromagnetic vibrating repose angle meter. Further, the charge was measured by the blow-off method. The relative permittivity was measured by forming a magnetic brush on a magroller. The relative permittivity $\epsilon$ of a toner is usually 3. The parent particle was also tested for these properties. The results are shown in Table 3.

TABLE 3

| Item of measurement | Core material | Post treatment |
|---|---|---|
| Specific resistance (Ω · cm) | $10^3$ | $10^{14}$ |
| Angle of repose (°) | 42 | 36 |
| Charge (μC/g) | −0.5 | −21 |
| Specific resistance | 170 | 32 |

The toner was also tested for printing and durability. Printing of a paper all over black was conducted using the mono-component developing apparatus described in Example A1, and the optical density (referred to hereinafter as O.D.) was measured at 5 points of the paper to calculate the average value. As the result, it was confirmed that an image having an O.D. of 1.5 or more and an excellent fixing ability was formed. A durability test was also conducted by printing a paper all over with black 30,000 times and measuring the O.D. of the paper every 5,000 sheets. The results are shown in Table 4.

TABLE 4

| Number of sheet printed | O.D. value |
|---|---|
| 5,000 | 1.57 |
| 10,000 | 1.56 |
| 15,000 | 1.55 |
| 20,000 | 1.55 |
| 25,000 | 1.55 |
| 30,000 | 1.55 |

The printed sheet after 30,000 printings also formed a clear image without the fog as for the printed sheet at the initial stage of printing. When the toner prepared in this example was tested in the same manner as described above after it was sealed in a container and stored under the circumstance at 30° C. and relative humidity of 80% for 3 months, it showed no deterioration of the properties and formed a clear image.

The tolerance of the development gap of the toner thus prepared was also evaluated in the same manner as Example A1. The results are shown in Table 5.

TABLE 5

| Kind of toners | Permissible development gap (μm) | Evaluation of images |
|---|---|---|
| Conventional mono-component | 30 | 2 |
| Conventional two-component | 400 | 4 |
| The present invention | 400 | 4 |

It was confirmed also in this example that the development voltage dependency of an image density is substantially constant at any development gaps within the permissible development gaps defined in Table 5.

Therefore, the toner according to this example has high applicability to an imaging device for tone expression, particularly a copier and thus is very useful.

COMPARATIVE EXAMPLE B1

The powder having the composition prepared in Example B1 (2) was treated in a ball mill or a heater mixer. The powder treated for 1 hour in a ball mill or in a heater mixer was classified by passing through sieves and the resistance was measured. The results are shown in Table 6.

TABLE 6

| Treatment method | Specific resistance ($\Omega \cdot cm$) |
| --- | --- |
| Ball mill | $10^3$ |
| Heater mixer | $10^4$ |

It was found that the toners prepared by treating the powder in the ball mill or the heater mixer had substantially the same specific resistance as the parent particle and any insulating layer was not formed.

EXAMPLE B2

Toners were prepared in the same manner as Example B1 except that an insulating layer was formed on the surface of the particle with insulating resins having a viscosity different from that in Example B1. The insulating resins are all acrylic resins, and five acrylic resins having different viscosity properties were used. The viscosity of each resin was measured at 80° C. The specific resistance of the toner obtained was measured in the same manner as Example B1. The results are shown in Table 7.

In Table 7, the clear circle ○ in the column for the insulation property means a specific resistance of $10^{14}$ $\Omega$.cm or more and the cross x means a specific resistance of less than $10^{14}$ $\Omega$.cm. Imaging was conducted with the toner obtained in the same manner as Example B1. The toners prepared with the resins C, D and E, respectively exhibited the same results as Example B1 and formed clear images.

TABLE 7

| Resin | Viscosity (cP) | Insulation Property |
| --- | --- | --- |
| A | $3.8 \times 10^6$ | X |
| B | $1.1 \times 10^6$ | X |
| C | $5.0 \times 10^5$ | ○ |
| D | $8.4 \times 10^4$ | ○ |
| E | $2.7 \times 10^4$ | ○ |

EXAMPLE B3

The core material in Example B1 was prepared by the spray drying method. The raw materials used for the preparation of the core material in Example B1 were dissolved and dispersed in toluene so that the dispersion had a solid content of 20% or 30%. The dispersion was spray granulated by a spray dryer to form the parent particle. Spraying was conducted with dual fluid nozzles under the spraying conditions of a pressure of 2 kg/cm$^2$ and a drying temperature of 30° C.

The particles obtained were adjusted to a particle diameter of 5-20 $\mu$m (average particle diameter: 10 $\mu$m) by classification. An insulating layer was further formed on the surface of the core material in the same manner as Example B1.

The toners obtained were used for imaging in the same manner as Example B1, and a clear image was formed as in Example B1.

EXAMPLE B4

Toners were prepared in the same manner as Example B1 except that the mechanochemical reaction was conducted at various treatment temperatures. The specific resistances and dielectric constants of the toner obtained were measured in the same manner as Example B1.

The results are shown in Table 8.

In Table 8, the clear circle means the specific resistance of $10^{14}$ $\Omega$.cm or more and the cross x means the specific resistance of less than $10^{14}$ $\Omega$.cm. The toners prepared by the treatment at 50° or 60° C. had large dielectric constants. When the cell resistances of these samples were measured, the specific resistance was about $10^5$ $\Omega$.cm or less and thus these samples were electroconductive. The toner particles prepared by the treatment at 90° C. adhere to each other to cause blocking and are thus difficult to use as toners. Table 8 shows the variation of the dielectric constant depending on the treatment temperatures. Imaging was conducted with the toners obtained in the same manner as Example B1. The toners prepared at 70° or 80° C., respectively exhibited the same results as Example B1 and formed clear images.

TABLE 8

| Treatment temperature (°C.) | Insulation Property | Dielectric constant |
| --- | --- | --- |
| 50 | X | 150 |
| 60 | X | 85 |
| 70 | ○ | 40 |
| 80 | ○ | 36 |
| 90 | ○ | 32 |

EXAMPLE B5

An insulating layer was formed by an acrylic fine particle other than the one used in Example B1 in the same manner as Example B1. The acrylic fine particles used had a particle diameter of 0.2 $\mu$m and a glass transition temperature of 90° C.

The treatment temperature was changed within the range of 50°-100° C., and an insulating layer was formed by a MECHANOFUSION system (HOSOKAWA MICRON Corp.). The viscosities of the parent particle and the acrylic fine particle were measured with a plate slip viscometer. The toner prepared was passed through sieves, and the specific resistance was measured. The results are shown in Table 9. The evaluation of the insulating property was, like the case in Table 8, illustrated with the clear circle ○ which means a specific resistance of $10^{14}$ $\Omega$.cm or more and the cross x which means a specific resistance of less than $10^{14}$ $\Omega$.cm.

TABLE 9

| Treatment temperature (°C.) | Viscosity of parent particle $\eta_b$ (cP) | Viscosity of insulating resin $\eta_g$ (cP) | Insulation Property |
| --- | --- | --- | --- |
| 50 | $1.2 \times 10^6$ | $3.8 \times 10^6$ | X |
| 60 | $8.5 \times 10^5$ | $2.1 \times 10^6$ | X |
| 70 | $7.2 \times 10^5$ | $1.1 \times 10^5$ | X |
| 80 | $5.7 \times 10^5$ | $5.7 \times 10^5$ | ○ |
| 90 | $4.4 \times 10^5$ | $3.0 \times 10^5$ | ○ |
| 100 | $3.5 \times 10^5$ | $1.8 \times 10^5$ | ○ |

The particles treated at 80, 90 and 100° C. had particle diameters of about 12, 12 and 21 μm, respectively. The particles treated at 100° C. aggregated to each other and caused blocking, so that they are difficult to be use as a toner.

EXAMPLE B6

In this example, the raw materials used were the same as Example B1 except the following differences.

The core material was prepared by the external addition of an electroconductive fine powder surrounding the insulating particle containing no electroconductive material so that the core material exhibited electroconductive properties. The toner was prepared by coating with an insulating resin.

That is, particles having a particle diameter of 12 μm were prepared by kneading, fine grinding and classifying a resin for an insulating integrating material and magnetic powder. Carbon black as an electroconductive fine particle was externally added to the particles thus obtained by MECHANOFUSION. The parent particle had a specific resistance of $10^2$ Ω.cm.

The parent particle was coated with an acrylic fine particle by the mechanochemical method. The acrylic fine particle having a particle diameter of 0.2 μm and a glass transition point of 85° C. was used. The external addition and film forming treatments were conducted at a temperature of about 80° C. in a MECHANOFUSION system (HOSOKAWA MICRON Corp.). After the treatment, the toner was classified.

The specific resistance, charge, angle of repose and relative permittivity of the toner thus obtained and the core material were measured in the same manner as Example B1. As the results, the toner had substantially the same properties as those in Example B1 and showed a higher dielectric property as compared with general toners.

The durability test was conducted in the same manner as Example B1. As the results, the properties of the toner were not deteriorated and quality was maintained, so that a preferred image was formed with the toner.

What is claimed is:

1. A toner material for use in a dry electrophotographic process, said toner material comprising mono-component toner particles for use in developing a latent electrostatic image on the surface of a receptor in which external electrostatic field lines extend above the receptor surface along the periphery of said latent image, each of said toner particles containing at least a colorant and a binder, each of said toner particles having sufficient electrical resistance to enable it to be stably charged and transferred with the aid of the external field lines to the receptor surface, each of said toner particles further comprising an inside portion having a relatively high permittivity and an outside portion having a relatively low permittivity, the respective permittivities of said inside and outside portions being such as to provide toner material within proximity of the receptor with the ability to modify the electric field lines extending above said latent image whereby the toner material may be used to promote development of a central portion of the image.

2. A toner material according to claim 1, wherein said inside portion comprises a core material containing at least the colorant and a binder, said core material having a higher permittivity than that of said outside portion, and wherein said outside portion comprises an electrically insulating layer surrounding said core material.

3. A toner material according to claim 2, wherein said core material has a relative permittivity of 6 or more.

4. A toner material according to claim 2, wherein said electrical insulation layer has a relative permittivity of less than 6.

5. A toner material according to claim 2, wherein said electrical insulation layer has a specific resistance of $1 \times 10^{14}$ Ω cm or more.

6. A toner material according to claim 2, wherein said electrically insulating layer is formed on said core material by a mechanochemical reaction.

7. In a dry electrophotographic process for developing an electrostatic latent image on the surface of a receptor wherein external electrostatic field lines are caused to extend above the surface of the receptor along the periphery of the latent image and wherein toner material to which a charge has been imparted is brought within range of said field lines whereby the charged toner material is caused to be attracted to and deposited on at least the periphery of said latent image by electrostatic force, the improvement comprising forming said toner material of mono-component toner particles, and forming each of said toner particles from at least a coloring matter and a binder, with each of said toner particles having an electric insulation property and comprising an inside portion having a relatively high permittivity and a surface portion having a relatively low permittivity, the respective permittivities of said inside and outside portions being such as to provide toner material within proximity of the receptor with the ability to modify the electric field lines extending above said latent image whereby the toner material may be used to promote development of a central portion of the image.

8. A process according to claim 7, wherein said inside portion comprises a core material containing at least the coloring matter and a binder, said core material having a higher permittivity than that of said surface portion, and wherein said surface portion comprises an electrically insulating layer surrounding said core material.

9. A toner material according to claim 2, wherein said electrically insulating layer surrounding the core material consists essentially of a thermoplastic resin.

10. A toner material according to claim 9, wherein the thermoplastic resin is a polymethyl methacrylate, a polyethyl methacrylate, a poly-n-butyl methacrylate, a polyester, a styrene-butadiene copolymer, a PVC, PVA, or PVAC copolymer, or a poly-γ-methyl-L-glutamate.

* * * * *